United States Patent [19]

MacGuire

[11] 4,282,946
[45] Aug. 11, 1981

[54] MULTI-TERRAIN VEHICLE

[76] Inventor: John C. MacGuire, 201 E. Ninth St., Casper, Wyo. 82601

[21] Appl. No.: 52,323

[22] Filed: Jun. 26, 1979

[51] Int. Cl.³ .............................................. B60V 3/02
[52] U.S. Cl. ..................................... 180/128; 180/119
[58] Field of Search ............... 180/116, 117, 118, 119, 180/120, 121, 122, 123, 124, 125, 126, 127, 128, 129, 130; 244/23 R; 114/67 R; 115/1 A, 1 C, 71

[56] References Cited
U.S. PATENT DOCUMENTS

| 3,090,455 | 5/1963 | Crowley | 180/119 X |
| 3,177,960 | 4/1965 | Cockerell | 180/129 |
| 3,621,931 | 11/1971 | Hunt | 180/127 X |
| 3,805,913 | 4/1974 | Jackes | 180/120 X |
| 3,810,522 | 5/1974 | Morgan et al. | 180/116 |
| 4,063,611 | 12/1977 | Anderson | 180/119 |

FOREIGN PATENT DOCUMENTS 805537 2/1969 United Kingdom ..................... 180/128

OTHER PUBLICATIONS

Multi-Terrain Vehicle BV-104 from *Jane's All the World's Hovercraft*.

*Primary Examiner*—John J. Love
*Assistant Examiner*—Randall A. Schrecengost
*Attorney, Agent, or Firm*—Michael W. York

[57] ABSTRACT

A multi-terrain vehicle for travelling on or above the ground or the like. The multi-terrain vehicle has a rigid body portion and a series of rigid ribs are rotatably connected on each side of the body portion that are capable of being rotated to their fully deployed positions. A sailcloth made from a material known by the trademark Dacron is located between each of the ribs so that the ribs and the sailcloth provide a collapsible air duct. When these air ducts are extended and provided with a source of air, this air can cause the multi-terrain vehicle to float or be located above the ground or the like. The rigid ribs also have spring members or the like that permit them to be self-adjusting to automatically maintain proper ground clearance. When the ducts are deployed the multi-terrain vehicle can be moved horizontally over the ground by controlling the amount of air flow through the various ducts. The multi-terrain vehicle also has retractable wheels that permit it to travel over suitable terrain such as a road or the like. When these retractable wheels are extended the collapsible ducts would normally be collapsed up against the respective sides of the body portion. The collapsible ducts and the retractable wheels of the multi-terrain vehicle permit it to travel over a wide variety of types of terrain.

11 Claims, 17 Drawing Figures

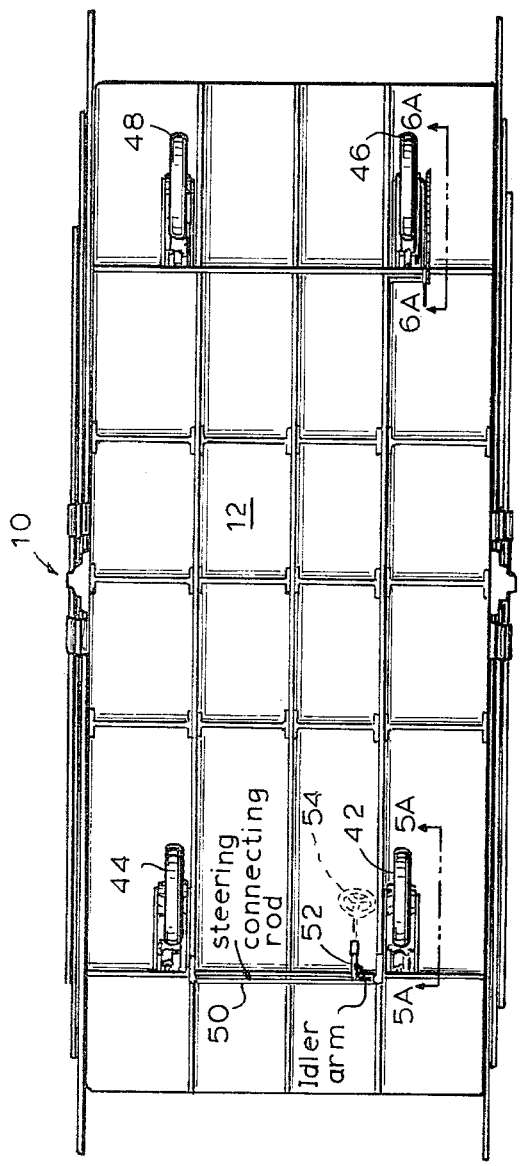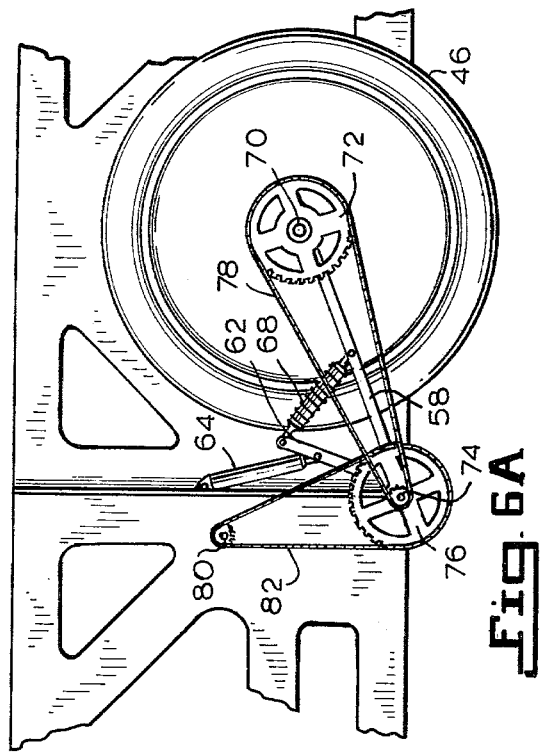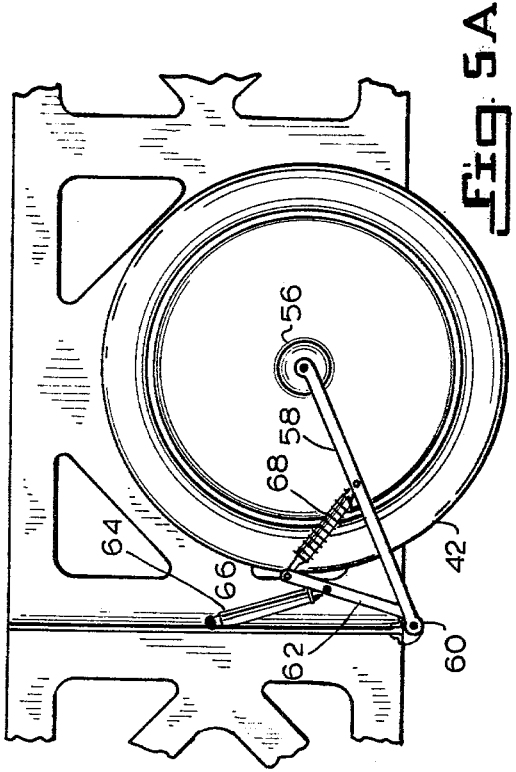

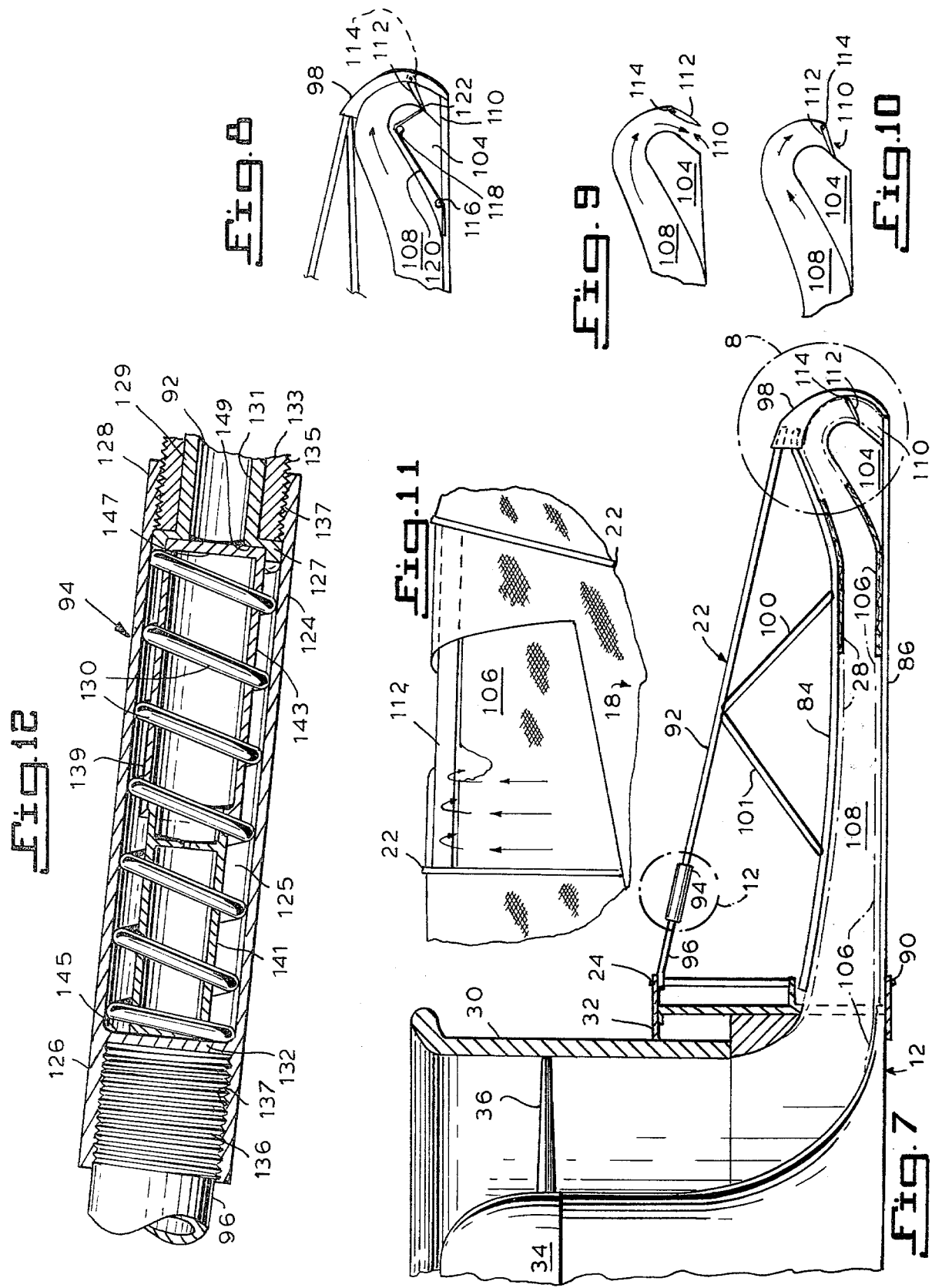

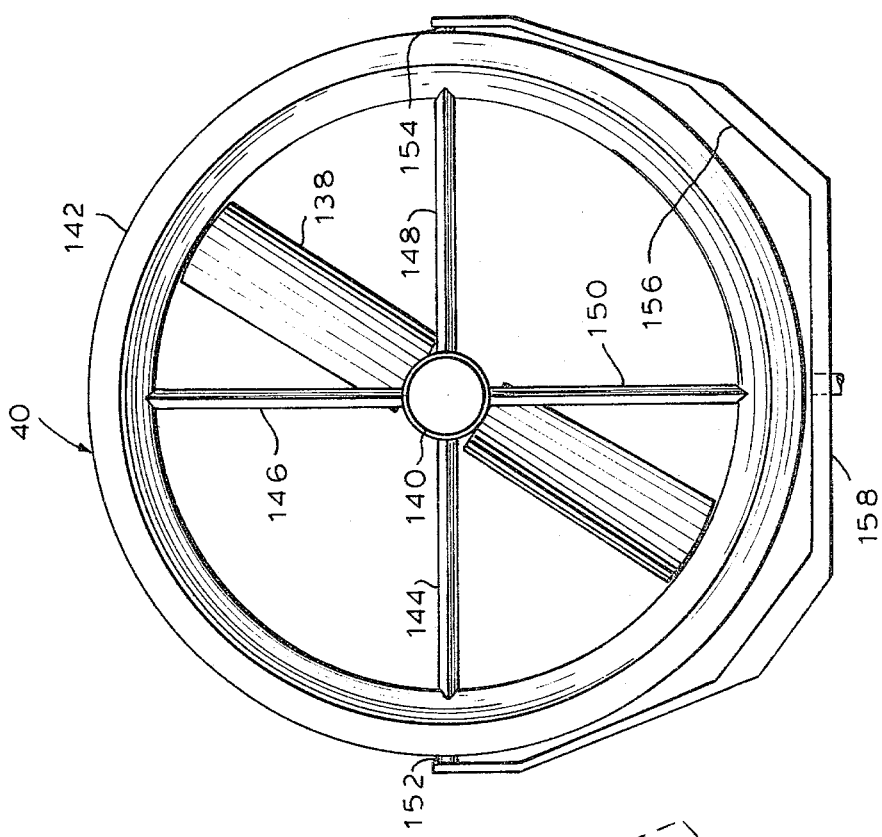
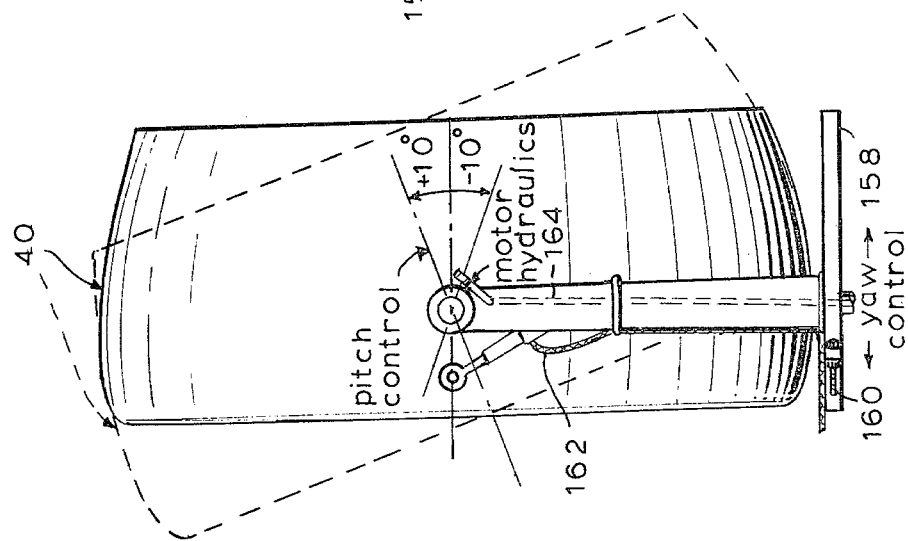
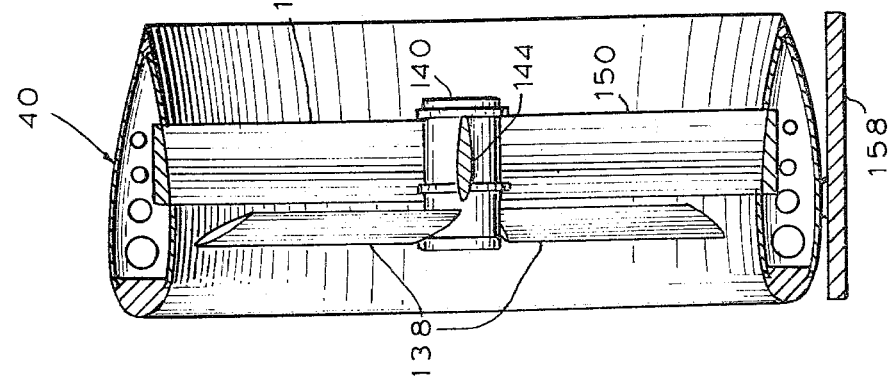

MULTI-TERRAIN VEHICLE

BACKGROUND OF THE INVENTION

Most of the remaining natural resources in the world are in remote sparsely populated areas and at this time there is a great deal of activity in the remote areas of the world from the efforts of major countries and companies to open up future resources to development. To develop any resource in a remote area, a large number of men and equipment must move back and forth on the ground to find, define and develop a reserve. Surveying, seismic work drilling, geological examination and many other types of field work are currently done in four-wheel drive trucks. These trucks can, given enough time, go almost anywhere the field operations require them to go but speed is in most instances severely hampered by mud all spring, snow all winter and bumpy ground all year. In many thousands of miles of off-road driving the speed of a four-wheel drive truck is limited to only three to five miles per hour on seemingly flat or gently rolling terrain because the small surface irregularities of the ground will tear up the truck and bruise the driver at speeds over five miles per hour. Perhaps one of the worst surfaces is the sagebrush flat of the Western United States, but this area of the country is subject to ever increasing vehicle travel as exploration for oil, uranium and other vital resources continues to grow.

Even when the vehicle operator carefully stays below five miles per hour on rough ground and does not abuse his equipment, his truck will seldom be of any value after about 40,000 commercial miles. For a typical field operation a truck usually only lasts about ten months simply because of the beating it takes from the surface irregularity of the ground.

It seems obvious that a better form of off road transportation is needed. The easiest solution would appear to be a vehicle which can fly just above the bumps but once the vehicle becomes an aircraft, costs and complexity seem to make it uneconomical to use in the field. Helicopters are great to use in the field but at a current rate of some one hundred twenty-five dollars per hour they cannot compete with the truck for much of the market. The ground effect machine can fly just over the bumps with comparatively little power and is a simple machine but the pure ground effect machine has inherent disadvantages.

In order to fly very high over the bumps without a helicopter type power requirement, the ground effect machine must have a large base area. This big, saucer-like machine cannot be transported on public highways or fit through narrow canyons or gates so the base must fold up into a smaller truck-size package for practicality. Moreover, a ground effect machine cannot stop as quickly as a wheeled vehicle, or turn as tightly, or climb a steep hill.

The multi-terrain vehicle overcomes these disadvantages and provides a vehicle that can transport itself over level terrain by a set of retractable steering wheels and a set of drive wheels. In addition, the base which comprises foldable skirts can be folded down to the size of a small vehicle which can be driven around on its wheels or easily transported on public highways but still able to unfold its base and fly over the bumps out on the job.

SUMMARY OF THE INVENTION

This invention relates to vehicles and more particularly to vehicles that have the capability of traversing various types of terrain.

It is an object of the present invention to provide a vehicle that is capable of operating over a wide variety of types of terrain.

It is an object of the present invention to provide a vehicle that is capable of operating along smooth surfaces and the like.

It is an object of the present invention to provide a vehicle that is capable of operating over unlevel terrain.

It is an object of the present invention to provide a vehicle that is capable of operating over water.

It is an object of the present invention to provide a vehicle that is capable of operating over various types of terrain without the use of wheels.

It is an object of the present invention to provide a vehicle that sustains itself above the earth by the use of air.

It is an object of the present invention to provide a vehicle that can sustain itself above the earth or ground and yet move forward or backward or laterally.

It is an object of the present invention to provide a vehicle that is capable of being collapsed into a compact configuration when it is desired to move the vehicle along a road surface such as a highway or the like.

It is an object of the present invention to provide a vehicle that has retractable wheels to permit the vehicle to travel over a wide variety of types of terrain.

It is an object of the present invention to provide a vehicle with apparatus for selectively controlling the air that is used to sustain the vehicle above the earth or ground.

It is a further object of the present invention to provide a vehicle that has apparatus for automatically having the vehicle base conform to various terrain irregularities.

It is also an object of the present invention to provide apparatus for causing the base of the vehicle to automatically conform to various terrain irregularities that is adjustable for different loads on the vehicle.

It is a further object of the present invention to provide a vehicle which has separate apparatus for sustaining the vehicle above the surface of the earth or ground and apparatus for propelling the vehicle in a lateral or forward direction.

The present invention provides a multi-terrain vehicle for use over a variety of terrains having a body portion, apparatus associated with the body portion of the vehicle to be in moving contact with the surface of the terrain and apparatus for permitting the vehicle to remain above the surface of the terrain.

BRIEF DESCRIPTION OF THE DRAWINGS

The invention will be hereinafter more fully described with reference to the accompanying drawings in which:

FIG. 4 is a bottom plan view of the apparatus illustrated in FIGS. 1, 2 and 3 illustrating the location of certain drive and steering wheels;

FIG. 5A is an enlarged view of a portion of the apparatus illustrated in FIG. 4 taken in the direction of the line 5A—5A with a wheel in its retracted position.

FIG. 6A is an enlarged view of a portion of the apparatus illustrated in FIG. 4 taken in the direction of the line 6A—6A with a wheel in its retracted position;

FIG. 7 is an enlarged sectional view of the apparatus illustrated in FIG. 2 taken substantially in the direction of the line 7—7 thereof;

FIG. 8 is an enlarged view of a portion of the apparatus illustrated in FIG. 7 taken within the circle 8 thereof but illustrating control assemblies for controlling the flow of air through a duct;

FIG. 9 is a simplified version of the apparatus illustrated in FIG. 8 illustrating a vane or duct outlet control in its open position;

FIG. 10 is a simplified version of the apparatus illustrated in FIG. 8 illustrating a vein or duct outlet in its closed position;

FIG. 11 is an enlarged broken-away view of a portion of the structure illustrated in FIG. 2 further illustrating the operation of a vein or duct outlet control of the invention;

FIG. 12 is an enlarged sectional view of a portion of the apparatus illustrated in FIG. 7 taken within the circle 12 thereof;

FIG. 13 is an enlarged sectional view of a portion of the structure illustrated in FIG. 2 taken substantially in the direction of the arrows 13—13 thereof;

FIG. 14 is an enlarged view of a portion of a structure illustrated in FIG. 2 taken substantially in the direction of the arrows 14—14 thereof and illustrating the alternate position of the apparatus in phantom lines; and FIG. 15 is an enlarged rear elevational view of a portion of the structure illustrated in FIG. 1 taken substantially in the direction of the arrows 15—15 thereof.

DETAILED DESCRIPTION OF THE PREFERRED EMBODIMENTS

Figure 1:
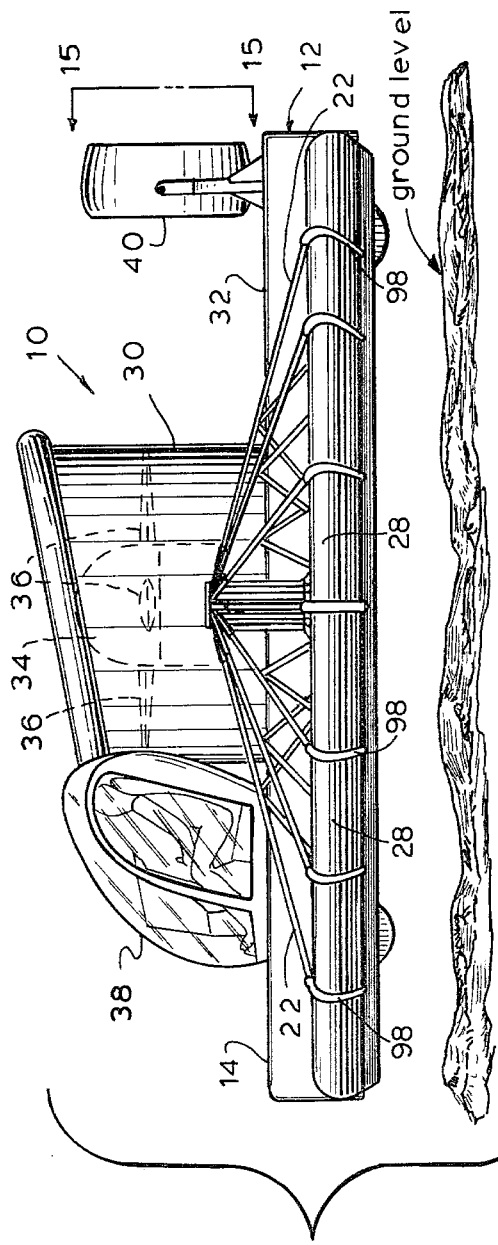
FIG. 1 is a side elevational view of the multi-terrain vehicle of the present invention.
Figure 3:
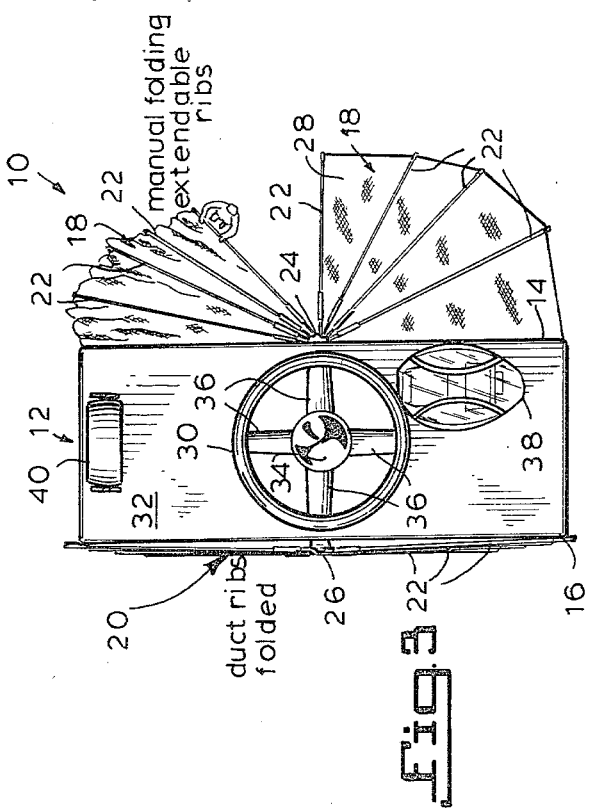
FIG. 3 is a top plan elevational view of the structure illustrated in FIG. 1 and FIG. 2 illustrating the multi-terrain vehicle having certain portions thereof collapsed and being partially collapsed into a compact configuration for movement over certain types of terrain.
Figure 2:
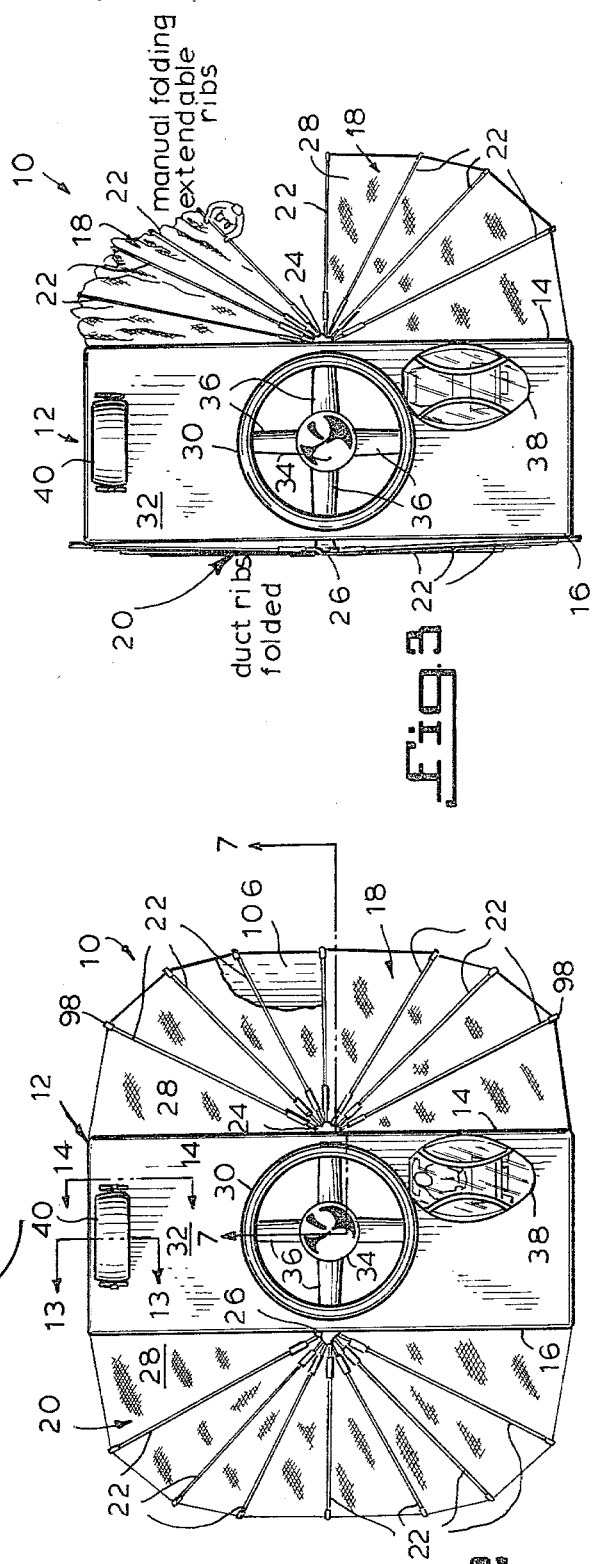
FIG. 2 is a top plan view of the structure illustrated in FIG. 1 showing the multi-terrain vehicle in position for traversing a plurality of different types of terrain.

Referring first to FIGS. 1 through 3 the multi-terrain vehicle of the invention is illustrated and is designated generally by the number 10. The multi-terrain vehicle 10 has a rigid rectangular shaped central body portion 12. Located on the respective sides 14 and 16 of the body portion 12 are skirts designated generally by the respective numbers 18 and 20 that are substantially identical. These skirts 18 and 20 each comprise a plurality of rib members 22 that are pivotally mounted about pivot points 24 and 26 that are substantially centrally located on the respective sides 14 and 16 of the body portion 12. The method of pivotally connecting the rib members 22 at the pivot point 26 is well known to those skilled in the art and hence will not be discussed in detail. The attachment at point 24 is similar to point 26 and will be hereinafter discussed. The skirts 18 and 20 also comprise flexible membranes or material 28 that is substantially impervious to air or other gas or gas mixtures that is located between and connected to the outer, upper and lower portions of the rib members 22. Consequently, the material 28 forms an upper outer skin for the respective skirts 18 and 20.

As best illustrated in FIGS. 2 and 3, the skirts 18 and 20 are capable of being extended outward for use over non-conventional or rough terrain. Whereas, as illustrated in FIG. 3, the skirts 18 and 20 can be compactly folded against the respective sides 14 and 16 of the body portion 12. The skirts 18 and 20 are locked in their extended and collapsed or folded configurations in a conventional manner that is well known to those skilled in the art.

As illustrated in FIGS. 1 through 3, the body portion 12 has a centrally located circular cross-sectional duct 30 extending upward from the upper portion 32 of the body portion 12. Located within the interior of the duct 30 is a hub assembly 34 and a propeller 36 that are connected in a conventional manner to a suitable engine or similar means (not shown) that are well known to those skilled in the art. A conventional cockpit 38 is also located on the forward upper portion 32 of the body portion 12. A thrust means 40, that will hereinafter be described in greater detail is also located on the rearward upper portion 32 of the body portion 12.

FIG. 4 illustrates a portion of the underside of the multi-terrain vehicle 10 that comprises the underside of the body portion 12. In particular, FIG. 4 illustrates the positioning of certain wheels that are adapted to permit the multi-terrain vehicle to traverse terrain by having these wheels in contact with the terrain such as a road and the like. These wheels comprise a forward set of steering wheels designated by the respective numbers 42 and 44 and a respective set of drive wheels designated by the respective numbers 46 and 48. The wheels 42 and 44 that are located near the forward portion of the body portion are connected to means well known in the art for causing them to be moved to cause the body portion of the multi-terrain vehicle 10 to move in a particular direction. In a similar manner, the drive wheels 46 and 48 that are connected to the body portion 12 are controlled or driven by suitable means well known in the art for the propulsion of vehicles over certain types of terrain and hence the propulsion means is not described in any particular detail.

The front wheels 42 and 44 are connected in a conventional manner to a steering connecting rod 50 which is in turn connected to an idler arm 52 that is in turn connected to a conventional steering wheel assembly 54. It will of course be appreciated that other forms of steering apparatus that are well known in the art can be substituted for that illustrated in FIG. 4.

Figure 5B:
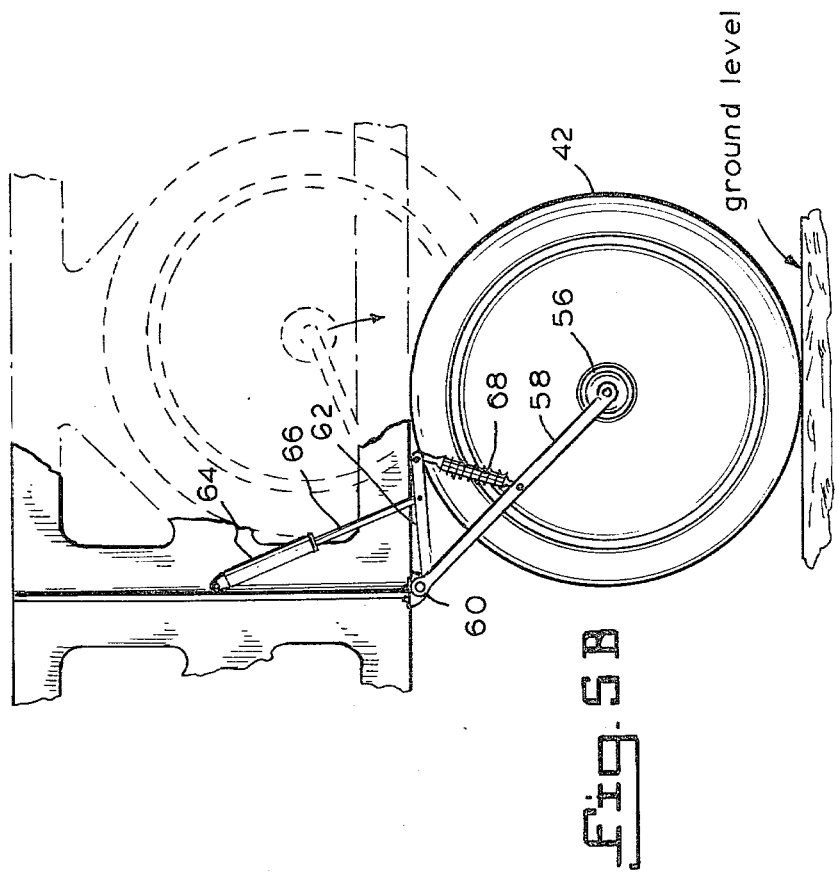
FIG. 5B is a view of the apparatus of FIG. 5A with the wheel in its extended position.

FIGS. 5A and 5B illustrate how the wheels 42 and 44 are extended from and retracted into the underside of the body 12. FIG. 5A illustrates the position that the wheels 42 and 44 would be in when the multi-terrain vehicle 10 was hovering above the terrain with these wheels out of contact with the terrain. FIG. 5B illustrates the position that the wheels 42 and 44 would be in when these wheels are in contact with the terrain such as when the skirts 18 and 20 are collapsed and the vehicle 10 is travelling along a road or the like.

Since all of the wheels 42, 44, 46 and 48 are substantially identical only one wheel 42 is illustrated in FIGS. 5A and 5B. The wheel 42 itself is conventional and hence will not be described in detail. The hub 56 or center of the wheel 42 is rotatably connected to the outer end portion of an elongated member 58 by conventional means known in the art. The opposite end 60 of the elongated member 58 is rotatably connected by conventional means to the underside portion of the body portion 12.

Another elongated member 62 has its inner end portion rotatably mounted near the end portion of the elongated member 58. The long axis of the elongated member 62 lies almost in the plane of the lower surface of the body 12 when the wheel 42 is in its extended position as illustrated in FIG. 5B. A hydraulic actuator 64 has the outer end portion of its extendable actuating member 66 rotatably connected to the elongated member 62 at a point outward beyond the midpoint of the elongated member 62. The outer end portion of the hydraulic actuator is suitably connected by means known in the art to structure located within the body portion 12. The elongated members 58 and 62 are also interconnected by a shock absorbing member 68 as will hereinafter be described in greater detail.

When it is desired to lower the wheel 42 suitable conventional controls (not shown) are operated that cause the elongated member 66 of the actuator 64 to extend outward to cause the members 62, 58 and the shock absorbing member 68 to pivot downward which in turn causes the hub 56 and the wheel 42 to rotate downward into the position illustrated in FIG. 5B where the wheel is in rotatable contact with the ground. A shock absorbing member 68 has one end connected to the outer end portion of the elongated member 62 and the other end connected to the elongated member 58 near its midpoint in a conventional manner. This shock absorbing member 68 not only connects portions of the elongated members 58 and 62 but it also absorbs shocks and the like that are received by the wheel 42 as it travels over bumps and the like on roadways or other terrain so that at least a portion of such shocks and the like are not transmitted to the body portion 12 of the multi-terrain vehicle 10.

Figure 6B:
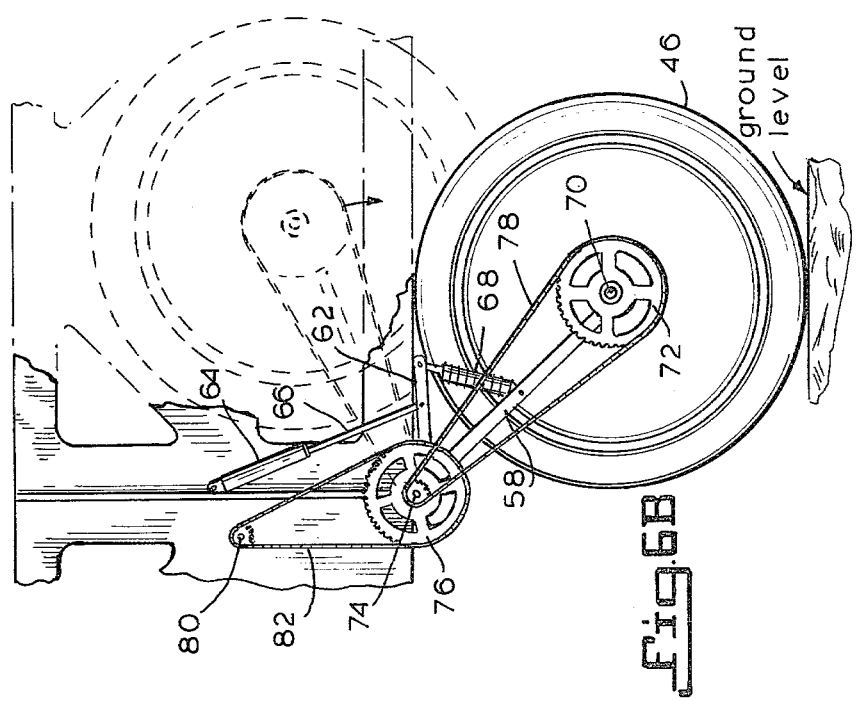
FIG. 6B is a view of the apparatus of FIG. 6A with the wheel in its extended position.

FIGS. 6A and 6B illustrate certain of the structure set forth in FIGS. 5A and 5B since the wheels 42 and 46 and associated structure are substantially identical. However, FIGS. 6A and 6B also illustrate additional structure which is associated with the rear drive wheels 46 and 48. Since the wheels 46 and 48 and their associated drive structure are identical, only the wheel 46 and its associated drive structure is illustrated in FIGS. 6A and 6B. It should be noted that there are elongated members 58 and 62 associated with the wheel 46 as well as an actuating member 64 with an extendable elongated member 66 and a shock absorbing member 68. The center portion of the wheel 46 is rigidly connected to a shaft 70 which is in turn rigidly connected to a sprocket 72. Another sprocket 74 which is smaller in diameter is rigidly connected to a larger diameter sprocket 76 which is in turn rotatably mounted on the body member 12 near the juncture of the elongated members 62 and 58. It should also be noted that a drive chain member 78 interconnects the sprockets 72 and 74. Another small diameter sprocket 80 is located on the body member 12 and another driving chain member 82 interconnects the smaller diameter sprocket 80 and the larger diameter sprocket 76.

The sprocket 80 is connected by conventional means for driving the sprocket such as a hydraulic drive which is well known in the art and hence is not shown. This driving means causes the sprocket 80 to rotate which in turn causes the sprocket 76 to rotate in view of the driving chain member 82. The smaller diameter sprocket 74 which is rigidly connected to the sprocket 76 is also caused to rotate and this causes the sprocket 72 to rotate in view of the driving chain member 78. As a consequence, the wheel 46 is caused to rotate and move the multi-terrain vehicle 10 along the terrain that the wheel is located on such as a roadway or the like. It will of course be appreciated that the wheel 46 is only driven when it is in its extended position as is illustrated in FIG. 6B.

FIG. 7 illustrates a side elevational view of a typical rib member 22 and a portion of the body 12 including the duct 30, associated propeller 36 and hub assembly 34. The rib member 22 comprises two substantially parallel aluminum, or other similar material, tubes 84 and 86. The inner end portion of the tube member 86 is rotatably connected to the main body member 12 at the pivot point 90. The rib member 22 also comprises an upper tubular member which can be made of aluminum or a similar material that is designated by the number 92. This tubular member 92 slopes downward at an angle with respect to the other tubular members 84 and 86 as it extends outward from the body member 12 and its inner end portion is connected to a buffer assembly 94 which will be hereinafter described in greater detail. The buffer assembly 94 is in turn connected by another short tubular member 96 to the body portion 12 at a pivot point designated by the number 24. The pivotal connection at point 90 is made through the use of a ball joint or the like so that the tube member 86 can pivot substantially horizontally and vertically about the point 90. The pivot points 90 and 24 permit the rib member 22 to be rotated substantially horizontally as illustrated in FIG. 3 and since the rib member 22 is only rotatably connected to the main body member 12 at the pivot points 90 and 24, the entire rib 22 can move in a substantially vertical direction in view of the assembly 94 and the ball joint or the like at pivot point 90. The outer end portions of the tubular members 84, 86 and 92 are all connected to a curved outer end portion 98 which can be made from aluminum or other similar material.

In order to give the rib member 22 rigidity, aluminum tube members 100 and 101 are located between and attached to the hollow tube members 84 and 92. Another smaller aluminum or similar type material member 104 is attached to the outer end portion of the tubular member 86. Portions of the upper side of the skirt 18 are connected to the underside of the members 84 and 98. Another lower skirt 106 has a portion thereof connected to the upper side of the member 86 and the member 104. In addition, the lower skirt 106 extends into the duct member 30. As a consequence when the propeller 36 rotates, air is caused to pass into the passage 108 that is created by the skirts 18 and 106. It should be noted that the air is caused to exit from the duct 108 formed by the upper and lower skirts 18 and 106 through the duct 108 exit designated by the number 110. In addition, a control vane 112 is located in the duct exit area 110.

The details of the duct exit area 110 and the control vane 112 are illustrated in FIGS. 8, 9, 10 and 11. As best illustrated in FIG. 8, the control vane 112 has its outer end portion designated by the number 114 pivotally connected to the outer skirt 18 at a location near the exit area 110. As illustrated in FIG. 8, two pulleys 116 and 118 are rotatably connected to the member 104. A control cable 120 winds around these pulleys and has its outer end portion connected to the inner end portion 122 of the control vane 112. Consequently, by pulling in or letting out on the control cable member 120 through conventional means well known in the art that are not shown, the control vane 112 can be caused to close, partially close or to permit the exit area 110 to be completely open. As illustrated in FIG. 9, the control vane is completely open and the air is free to flow substantially completely unrestricted through the exit area 110. Whereas, in FIG. 10 the vane 112 is completely closed and consequently little or no air is permitted to pass through the exit area 110.

FIG. 11 illustrates a top view of the control vane 112, the skirts 106 and 18 and two adjacent rib members 22. As illustrated in FIG. 11, the control vane 112 comprises an elongated member that extends completely between the ribs 22 which is connected to the skirt 18 along the seam 114. The arrows in FIG. 11 also illustrate the path of the air flow between the skirts 18 and 106. Consequently, when the control vane 112 is in its closed position as illustrated in FIG. 10, the air flow is virtually shut off between the adjacent rib members 22 as illustrated in FIG. 11. There are a plurality of rib members 22 as illustrated in FIGS. 2 and 3 present on each side 14 and 16 of the body portion 12. As a result by selectively opening or closing the control vanes 112 between various respective rib members 22, the operator of the multi-terrain vehicle 10 can control the direction in which the multi-terrain vehicle 10 will travel when the multi-terrain vehicle is in its hovering mode.

FIG. 12 is an enlarged view of the buffer assembly 94 illustrated in FIG. 7. The buffer assembly 94 comprises a tubular partially hollow cylindrical member 124 that has respective threaded end portions 126 and 128. It should be noted that a coil spring 130 is located within the cavity 125 of the hollow housing 124. One end of this spring 130 rests against and exerts a force on the closed end portion or wall 132 of the cavity 125 and the other end of the spring 130 rests against and exerts a force upon the enlarged flared inner end portion 127 of the tubular member 92. The hollow cylindrical portion 129 of the tubular member 92 that is adjacent to the end portion 127 is slidably received within an aperature 131 of a spring rate adjusting plug member 133.

The adjusting plug member 133 has threads 135 on its exterior that are adapted to be received by the threads 137 of the threaded portion 128. Located inside the cavity 125 within the coils of the spring 130 is a damper assembly 139. The damper assembly 139 comprises two hollow cylindrical members 141 and 143 that have respective closed outer end portions 145 and 147. The exterior of the hollow cylindrical member 141 and the interior of the hollow cylindrical member 143 are sized and shaped so that the open end portion of the hollow cylindrical member 141 slides within the hollow cylindrical member 143. The interior of the hollow cylindrical member 143 is filled with a suitable fluid such as air and this fluid is sealed within the damper assembly through means that are well known in the art. The end portion 145 of the hollow cylindrical member 141 abuts up against the wall 132 and the end portion 147 of the hollow cylindrical member 143 fits within a recess 149 in the flared end portion 127 of the tubular member 92.

The buffer assembly 94 permits the rib 22 to deflect so that the various rib members 22 can move up or down to substantially conform velocity to the contour of the terrain located below the various ribs 22 when the multi-terrain vehicle 10 is in its hovering mode. In this connection, it should be noted that the spring 130 which exerts an outward and downward force on the flared end portion 127 of the tubular member normally keeps the member in its extended position.

However, as upward forces are exerted on the rib 22 due to the airflow near the outer end portion of the rib, this will cause the rib to bend or deflect upward since at some point the force of the spring 130 will be overcome so that the spring 130 becomes compressed and the flared end portion 127 moves further into the cavity 125. As the force decreases then the spring 130 will return the tubular member 92 to its outward position so that the rib 22 assumes its normal configuration. In order to prevent the buffer assembly from responding harshly to forces exerted by the tube 92 of the rib 22, the damper assembly 139 tends to slow down the movement of the tube into the cavity 125 since the end portion 147 of the damper assembly fits into and exerts a force upon the flared portion 127 of the tube.

It should be noted that the adjusting plug 133 can be turned to either compress the spring 132 or to permit it to relax. This, of course, changes the force that the spring 132 exerts upon the flared portion 127 of the tube of the rib 22. This permits the buffer assembly 94 to be adjusted for varying loads exerted upon the ribs and associated structure.

Thrust means 40 that are illustrated in FIGS. 1 through 3 are illustrated in greater detail in FIGS. 13, 14 and 15. The thrust means 40 is designed to give the multi-terrain vehicle more ability to move laterally and to some extent vertically when the multi-terrain vehicle 10 is in its hovering mode. As illustrated in FIGS. 13 and 15, the thrust means has a propeller 138 and an associated propeller hub 140. A ring or cylindrical shaped propeller guard or shroud 142 completely surrounds the propeller 138. The propeller hub 140 and the propeller 138 are centrally located within the propeller guard 142 by means of four members 144, 146, 148 and 150 that extend outward from the propeller hub 140 and have respective outer end portions that are connected to the interior of the propeller guard 142. The primary purpose of the propeller guard 142 is to prevent injury to personnel when the propeller blade 138 is rotating.

As illustrated in FIGS. 14 and 15 the propeller 138 and its associated structure including the shroud 142 are capable of both yaw and pitch control. The shroud 142, the propeller 138 and associated hub 140 are pivotally connected to the respective ends 152 and 154 of a yoke assembly 156 which is in turn rigidly connected to a base plate member 158 that is rotatably mounted on the upper portion of the body portion 12 of the multi-terrain vehicle 10. As illustrated in FIG. 14, the base plate 158 can be rotated by a cable 160 or similar apparatus well known in the art to cause the base plate and propeller 138 to be rotated. Also as illustrated in FIG. 14, the shroud or propeller guard member 142 can be tilted upward and downward by suitable cable apparatus designated generally by the number 162 which are well known in the art. The propeller itself can be driven hydraulically through the hydraulic lines designated by the number 164. The motor hydraulic drive means are not illustrated in any detail since they are well known in the art.

The multi-terrain vehicle 10 is utilized in the following manner. Normally a multi-terrain vehicle 10 would have its wheels 42, 44, 46 and 48 extended or deployed as illustrated in FIGS. 4, 5A, 5B, 6A and 6B so that the multi-terrain vehicle could traverse typical smooth terrain such as highways, roadways or the like. This would permit the operator of the multi-terrain vehicle 10 to bring the multi-terrain vehicle into the vicinity of terrain which was not generally accessible or conveniently accessible to wheeled type vehicles. In utilizing such wheels and in traversing such terrain as roadways and the like, the ribs illustrated in FIGS. 1 through 4 designated by the number 22 would be collapsed as illustrated in FIG. 4. Upon reaching a suitable location where the terrain was difficult for a wheeled vehicle, the ribs 22 and associated skirts 18 and 20 would be deployed as illustrated in FIG. 3 so that the multi-terrain vehicle 10 could be prepared for its hovering mode. After the ribs 22 were deployed, the ribs are held together so as to form two complete outer skirts designated by the numbers 18 and 20.

The main propeller 36 which is illustrated in FIGS. 1 through 3 would then be caused to rotate through suitable conventional means well known in the art. This in turn would cause air to be sucked into the duct 30 and then conveyed through the various ducts such as duct 108 illustrated in FIG. 7 that is formed by the skirts 18 and 106. This air would then be transmitted to the duct exit such as that designated by the number 110 which is illustrated in FIGS. 7, 8, 9 and 10. When the propeller 36 is generating a sufficient volume of air, this would cause the multi-terrain vehicle 10 to lift off the ground or go into its hovering mode.

When the multi-terrain vehicle 10 is in its hovering mode as a result of sufficient air being generated by the propeller 36, the wheels 42, 44, 46 and 48 illustrated in FIG. 4 are retracted by the mechanism previously described and illustrated in FIGS. 5A and 6A. The multi-terrain vehicle is then propelled in a substantially lateral direction by means of the auxiliary or additional propeller 138 that is illustrated in FIGS. 1, 2 and 3 and in greater detail in FIGS. 13, 14 and 15. Moreover, as indicated with respect to FIGS. 13 through 15, this propeller can be maneuvered so as to permit the multi-terrain vehicle to some extent at least to go up and down terrain that is not strictly flat.

As previously indicated, in some cases, the multi-terrain vehicle can be controlled in terms of its lateral propulsion by means of the vane 112 and associated apparatus illustrated in FIGS. 7, 8, 9 and 10 by using the vane 112 to close off certain segments of the duct between adjacent ribs 22 such as duct 108 illustrated in FIG. 7 and FIG. 11 so that the air is caused to be expelled from only certain portions of the duct located between various ribs 22. The vanes, such as the vane 112, can be utilized alone in some instances to control lateral and to some extent semi-vertical orientation or movement of the multi-terrain vehicle 10 alone. However, the additional propeller 138 is generally desired when the multi-terrain vehicle 10 is going to traverse rather large or comparatively large distances.

As illustrated in FIGS. 7 and 12 in one embodiment of the multi-terrain vehicle 10, provision is made for automatically permitting the various ribs 22 to conform in a substantially vertical direction in accordance with various changes in the terrain that is located adjacent to the underside of the rib portion 22 as a result of the buffer assembly 94. The buffer assembly 94 permits the tubular member 92 illustrated in FIGS. 7 and 12 to move inward and outward inside the housing 124 in accordance with various pressures that are exerted upon the associated rib member 22 as a result of air exiting from the exit area 110 that impinges upon the terrain located underneath the rib member 22. Consequently, the rib members 22 tend to conform and move upward and downward in a vertical direction in accordance with the various differences in the terrain as the vehicle moves across terrain that has variations in it. As previously indicated, means are also provided for adjusting the spring 130 force as illustrated in FIG. 12. The spring force 130 is increased by screwing the adjusting plug member 133 further into the member 124 and it is decreased by screwing the plug member 133 in a direction out of the member 124.

Although the invention has been described in considerable detail with reference to certain preferred embodiments, it will be understood and appreciated that variations may be made within the spirit and scope of the invention as defined in the appended claims.

What is claimed is:

1. A multi-terrain vehicle for use over a variety of terrain having a body portion, means associated with said body portion for said vehicle to be in moving contact with the surface of said terrain and means for permitting said vehicle to remain above the surface of said terrain comprising a flexible portion for causing fluid to impinge upon the surface of said terrain and means for extending and folding said flexible portion, said flexible portion including rigid members and said means for extending and folding said flexible portion comprising vertical pivot means for rotatably connecting said rigid members to said body portion to permit said rigid members to be rotated in a substantially horizontal plane about said vertical pivot means.

2. The multi-terrain vehicle of claim 1 wherein said flexible portion comprises a plurality of ducts for conveying said fluid.

3. The multi-terrain vehicle of claim 2 wherein said ducts have segments or portions located between said rigid members.

4. The multi-terrain vehicle of claim 3 further comprising means located within said segments or portions for controlling the direction of travel of said multi-terrain vehicle.

5. The multi-terrain vehicle of claim 4 wherein said means located within said segments or portions for controlling the direction of travel of said multi-terrain vehicle comprises means for virtually shutting off fluid flow between adjacent rigid members.

6. The multi-terrain vehicle of claim 5 wherein said means for virtually shutting off fluid flow between adjacent rigid members comprises control vanes.

7. The multi-terrain vehicle of claim 6 further comprising means located on said rigid members for permitting said rigid members to deflect so that various rigid members can move up or down to substantially conform vertically to the contour of the terrain located below the various rigid members.

8. The multi-terrain vehicle of claim 7 wherein said means for permitting said rigid members to deflect comprises a buffer assembly.

9. The multi-terrain vehicle of claim 8 wherein said buffer assembly includes means for adjusting for varying loads exerted upon said rigid members and associated structure.

10. The multi-terrain vehicle of claim 8 further comprising means located on said body portion for permitting said multi-terrain vehicle to move laterally and to some extent vertically.

11. The multi-terrain vehicle of claim 9 wherein said means located on said body portion for permitting said multi-terrain vehicle to move laterally and to some extent vertically comprises propeller means capable of both yaw and pitch control.

* * * * *